United States Patent
Bergan et al.

(10) Patent No.: US 6,950,814 B2
(45) Date of Patent: Sep. 27, 2005

(54) NATURAL LANGUAGE PROCESSING METHODS AND SYSTEMS

(75) Inventors: Elias Bergan, Horgen (CH); Jürgen Klenk, Adliswil (CH); Gerd K. Binnig, Wollerau (CH)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 09/888,699

(22) Filed: Jun. 24, 2001

(65) Prior Publication Data

US 2002/0016784 A1 Feb. 7, 2002

(30) Foreign Application Priority Data

Jun. 24, 2000 (EP) ............................................. 00113438

(51) Int. Cl.[7] .......................... G06N 7/00; G06N 5/02; G06E 1/00; G06F 17/30; G06F 9/45
(52) U.S. Cl. ........................... 706/55; 706/20; 706/46; 706/47; 707/5; 717/143
(58) Field of Search ............................. 706/55, 45–47, 706/20, 15, 21, 1, 2, 3, 4; 705/5; 717/143; 707/5

(56) References Cited

U.S. PATENT DOCUMENTS

| | | | | |
|---|---|---|---|---|
| 5,056,021 A | * | 10/1991 | Ausborn | 704/9 |
| 5,355,311 A | * | 10/1994 | Horioka | 704/1 |
| 5,535,121 A | * | 7/1996 | Roche et al. | 704/9 |
| 5,845,049 A | * | 12/1998 | Wu | 706/20 |
| 5,995,955 A | * | 11/1999 | Oatman et al. | 709/50 |

| | | | | |
|---|---|---|---|---|
| 2002/0188436 A1 | * | 12/2002 | Schmidt et al. | 704/1 |

FOREIGN PATENT DOCUMENTS

| | | | | |
|---|---|---|---|---|
| EP | 962873 A1 | * | 12/1999 | G06F/17/28 |
| WO | WO 99/63455 | | 12/1999 | |

OTHER PUBLICATIONS

Guha et al; "Enabling Agents to Work Together"; Communications of the ACM; Jul. 1994; vol. 37, Iss. 7□□.*
R.V. Guha et al., "Enabling agents to work together", Communications of the ACM, vol. 37, No. 7, Jul. 1994, pp. 127–142.

* cited by examiner

Primary Examiner—Anthony Knight
Assistant Examiner—Meltin Bell
(74) Attorney, Agent, or Firm—Ference & Associates

(57) ABSTRACT

Scheme for enriching an input network with knowledge from a fractal semantic knowledge network. The input network comprises objects and pointers between these objects, and the knowledge network comprises semantic units, and a plurality of Jani, whereby any of these Jani is associated with one or more of the semantic units such that the respective Janus is able to operate on one or more of the semantic units. The following steps are carried out: finding a counterpart element for an object or a pointer by looking for a semantic unit that is related to the object or the pointer; establishing a classification connection between the object or the pointer and its counterpart element; assigning the module that is associated with the counterpart element, if any, to the object or the pointer; examining the objects' or the pointers' neighborhoods in the input network by comparing them with the counterpart elements' neighborhoods in knowledge network to verify the classification connection.

36 Claims, 11 Drawing Sheets

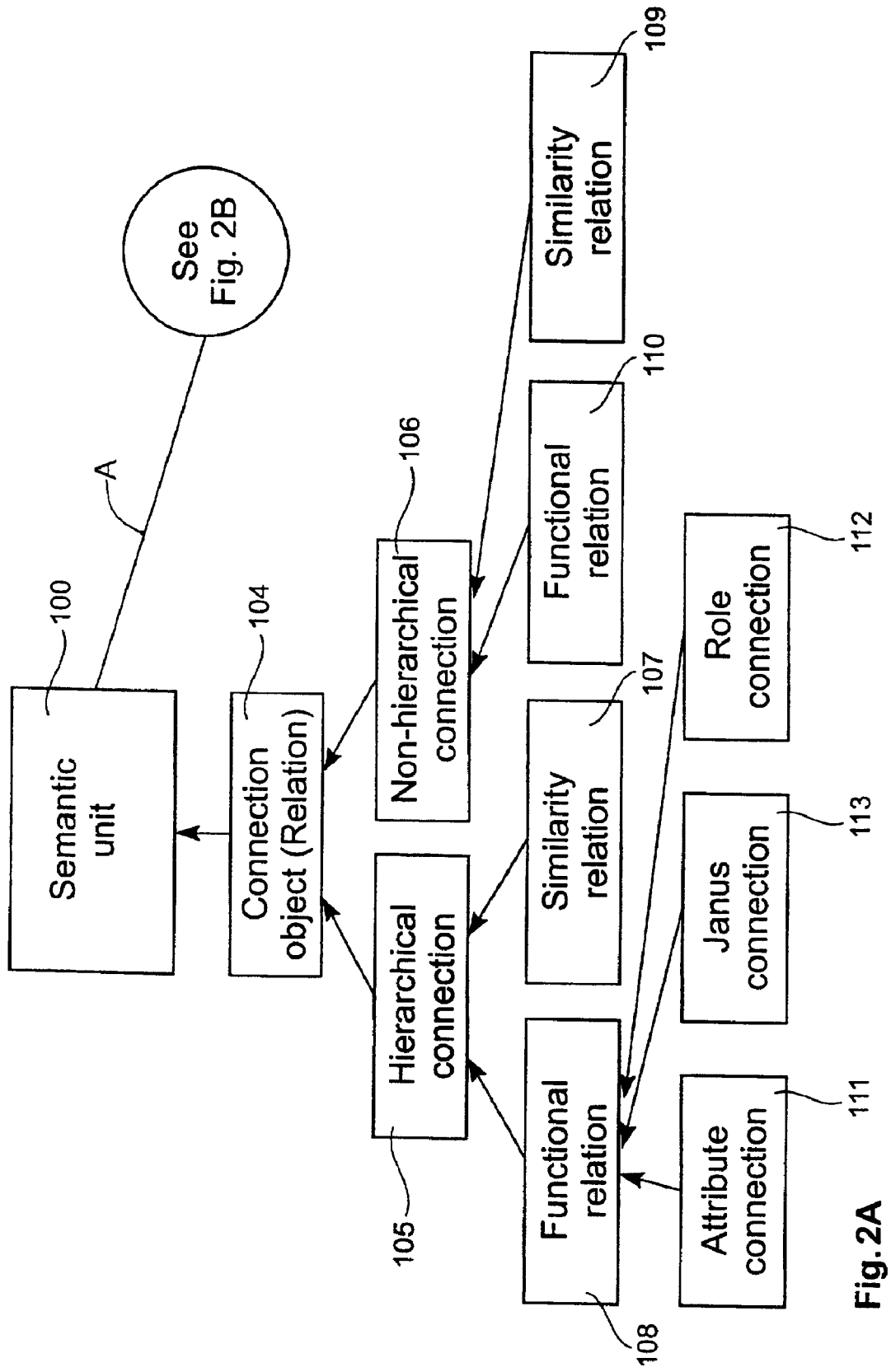

| m = 1 | m = 2 | m = 3 |
|-------|-------|-------|
| 30.2  | 30.2  | 30.2  |
| 30.4  | 30.6  | 30.6  |
| 30.5  | 33.1  | 30.7  |
| 33.1  | 33.3  | 33.1  |
| 33.2  |       | 33.3  |
| 33.7  |       | 33.8  |
| 30.3  |       |       |

| m = 1 | m = 2 |
|-------|-------|
| 40.2  | .     |
| 40.4  | .     |
| 47.3  | .     |
| 47.4  | .     |
| 46    | .     |

NATURAL LANGUAGE PROCESSING METHODS AND SYSTEMS

CLAIM FOR PRIORITY

This application claims priority from European Application No. 00113438.6, filed on Jun. 24, 2000, and which is hereby incorporated by reference as if fully set forth herein.

FIELD OF THE INVENTION

The present invention concerns the processing of an input network in conjunction with a fractal semantic network—with local pervasive intelligence-serving as knowledge base in order to use knowledge from this knowledge base for the purpose of understanding.

BACKGROUND OF THE INVENTION

Natural language understanding is a topic that is attracting a lot of attention since it eventually will allow improvement of the interface and interaction between humans and machines, such as computers or personal digital assistants (PDAs), for example.

Despite a lot of efforts, the advances in natural language understanding are not very satisfying. In particular, the research area of automated apprehension of meaning from speech or from text has not made much progress over the last years.

In the area of automated apprehension of meaning there are two different philosophies, the "holistic" approach and the "componentized" approach. While the latter approach has achieved a great number of detailed results in the individual components such as anaphora resolution and deep syntactic analysis, among many others, it has not yet achieved the goal of combining these individual components to one global and overall solution within which these components can interact. It is even unclear at the moment whether there exists for these components any suitable form of combination that includes feedback mechanisms.

When it comes to understanding the meaning of speech, i.e. the semantical interpretation of speech, the breakthrough has not yet been achieved. As a consequence, the pragmatical analysis, the control of tools and devices by natural speech, has also not been developed very far. Current systems still require a command language with a few simple keywords to perform their understanding tasks. A typical example of a modern speech/text recognition system is described in the article "Enabling agents to work together," by R. V. Guha et al., Communications of the ACM, Vol. 37, No. 7, July 1994, pp. 127–142, and reviewed by T. J. Schult in the German article "Transparente Trivialitäten; Cyc-Wissensbasis in WWW," c't, 1996, Vol. 10, pp. 118–121. The Cyc-system described by R. V. Guha is a knowledge based system for true/false categorization of input statements. T. J. Schult points out in his article that the knowledge representation in the database used in the Cyc-system is not standardized and uses only the following relations for deduction: 'is element of', 'is subset of', and 'has subsets'. Guha's approach is "holistic".

In the present context, we focus on the "holistic" approach that is also referred to as the cognitive approach. A knowledge database is employed in order to be able to perform the meaning understanding task. This kind of an approach has been used by others before, but the present model to represent the world knowledge in a knowledge database modeled as a fractal semantic network is unique and has a number of important differences compared to all other models around. In particular, a self-similar hierarchical network of n-th order is employed, as for example disclosed and claimed in PCT Patent application WO 99/63455, International Application No.: PCT/IB99/00231, entitled "Processing of Textual Information and Automated Apprehension of Information", currently assigned to the assignee of the present application. Furthermore, local pervasive intelligence is employed, as specified in the German Patent application "Fraktales Netz n-ter Ordnung zum Behandeln komplexer Strukturen", application No.: 199008204.9, filing date 15 Feb. 1999, assigned to the assignee of the present application and to Delphi Creative Technologies. This local pervasive intelligence is called a Janus, using a name of the Roman mythology (plural: Jani). The Janus is described in very general terms in this German patent application. These two patent applications are incorporated in their entirety.

It is to be noted that there is a fundamental difference between data or information and knowledge. One can accumulate arbitrary amounts of data or information without having any knowledge, while the converse is not possible. Data or information is the isolated representation of pure facts, while knowledge arises from strong connections between these facts, and from abstraction, which in turn allows both for performing understanding and learning.

It is an object of the present invention to provide an efficient scheme for the extraction of meaning from an input by using knowledge.

It is an object of the present invention to provide a system for the efficient processing of an input in order to extract meaning from the input by using knowledge.

SUMMARY OF THE INVENTION

The present invention concerns a method and system for enriching an input network with knowledge from a fractal semantic knowledge network. The input network comprises semantic units and the knowledge network comprises semantic units and a plurality of modules, whereby any of these modules is associated with one or more of the semantic units in the knowledge network. The modules are able to operate on the one or more of the semantic units. The following steps are performed: (a) finding a counterpart element for a semantic unit in the input network by looking for a related semantic unit in the knowledge network; (b) establishing a classification connection between the semantic unit in the input network and its counterpart element in the knowledge network; (c) assigning the module(s) that is (are) associated with the counterpart element, if any, to the semantic unit in the input network; and (d) examining the semantic unit's neighborhood in the input network by comparing it with the counterpart element's neighborhood in the knowledge network to verify and value the classification connection.

The present invention also concerns software modules (Classification Jani) for comparing the neighborhoods of those semantic units to which they are assigned with neighborhoods of the counterpart elements of the knowledge network in order to verify classification connections between the semantic units to which they are assigned and the counterpart elements. In addition, the software modules update classification values (Cx) of the classification connections if the neighborhoods of the semantic units in the input network resemble the neighborhoods of the counterpart elements in the knowledge network.

Furthermore, the present invention concerns software modules (Segmentation Jani) for grouping/segmenting the semantic units of the input network according to the segments/groups that their counterpart elements of the knowledge network belong to. To achieve this, the software modules look for counterpart semantic units in the knowledge database which belong to segments on higher levels of hierarchy; and, if such segments are identified, create segment units in the input network, connect the corresponding semantic units from the input network to the newly created segment units, and connect the newly created segment units with classification connections to the segments in the knowledge network.

The herein described Classification step and Segmentation step are the fundamental processes for driving the self-organization of the fractal semantic input network on a local scale. They may be repeated iteratively.

The process of Classification stands for the common task of comparing one semantic unit in an input network to other semantic units in the knowledge database. The goal here is to find comparable semantic units in the sense that they are alike, can perform similar tasks, have similar goals, are more general or more specific, are constituents or groups, or are in similar states, among other things. In our model the process of Classification is performed through extensive local neighborhood analysis. This means that the degree of similarity of two semantic units is determined by the degree of similarity of their local neighborhoods in the input network and in the knowledge database with respect to the above comparison factors.

While the Classification focuses on finding similar structures among semantic units, the Segmentation focuses on grouping semantic units according to similarities found during the Classification process.

In one aspect the present invention provides a method for enriching an input network with knowledge from a fractal semantic knowledge network, wherein said input network comprises objects and pointers between said objects, and the knowledge network comprises semantic units and a plurality of modules arranged in a fractal semantic network, whereby any one of said modules is associated with one or more of said semantic units such that the respective module is able to operate on the one or more of said semantic units, said method comprising the steps of: finding a counterpart element for an object or a pointer by looking for a semantic unit that is related to the object or the pointer; establishing a classification connection between the object or the pointer and its counterpart element; assigning the module that is associated with the counterpart element, if any, to the object or the pointer; determining the neighborhood of the object or the pointer in the input network and the neighborhood of the counterpart element in the knowledge network, and comparing the neighborhoods to verify the classification connection.

In another aspect of the present invention is a software module being assignable to an object or a pointer of an input network, whereby said software module when being triggered, performs the steps of: comparing the neighborhood of the object or pointer to which it is assigned with a neighborhood of a counterpart element of a fractal semantic knowledge network in order to verify a classification connection between said object or pointer to which it is assigned and the counterpart element; updating a classification value (Cx) of the classification connection if the neighborhood of said object or pointer in the input network resembles the neighborhood of the counterpart element in the knowledge network.

Another aspect of the present invention provides a software module being assignable to an object or a pointer of an input network, whereby said software module when being triggered, performs the steps of: looking for semantic units in a fractal semantic knowledge database which belong to a counterpart segment on a higher level of hierarchy; and if such a counterpart segment is identified, creating a new segment unit in the input network, and creating a classification connection from the new segment unit to the counterpart segment.

Furthermore the present invention provides a natural language processing system for enriching an input network with knowledge from a fractal semantic knowledge network, whereby the input network comprises objects and pointers between said objects, and the knowledge network comprises semantic units, the system comprising: a module for finding a counterpart element for an object or a pointer by looking for a semantic unit that is related to the object or the pointer; a module for establishing a classification connection between the object or the pointer and its counterpart element; a module for examining the objects' or the pointers' neighborhoods in the input network by comparing them with the counterpart elements' neighborhoods in knowledge network to verify the classification connection.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

The invention is described in detail below with reference to the following schematic drawings.

FIGS. 2A and 2B show the various elements (semantic units) of a fractal semantic knowledge database. This representation is a generalization of what is described in the above-mentioned in PCT Patent application WO 99/63455.

FIGS. 4A through 4F show various steps of the present scheme.

DETAILED DESCRIPTION OF THE PREFERRED EMBODIMENTS

In the following, the basic concept of the present invention is described. Before addressing different embodiments, the relevant terms and expressions are defined and explained.

Figure 1:
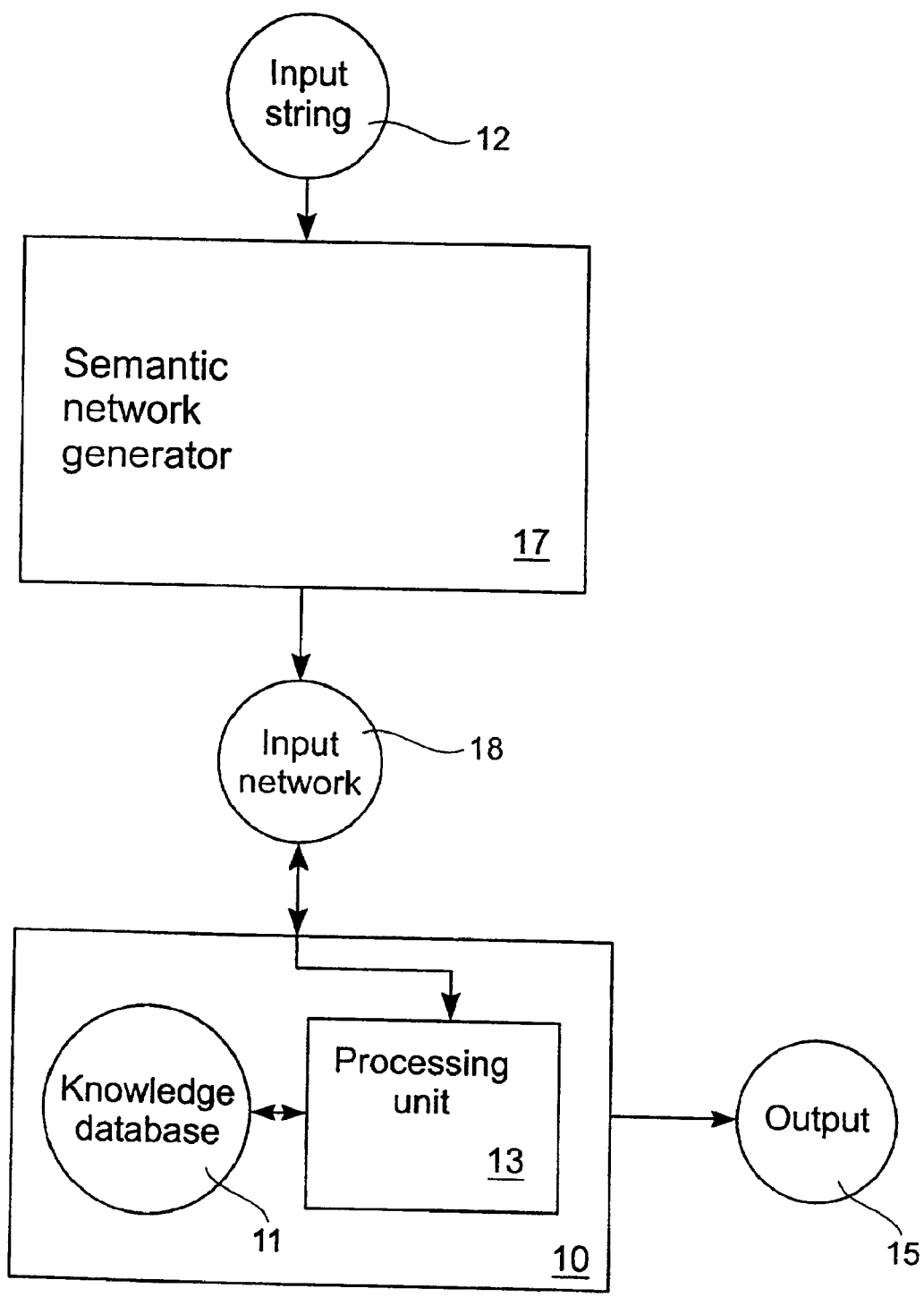
FIG. 1 is a schematic block diagram of one embodiment of a meaning understanding system, according to the present invention.
Figure 4A:
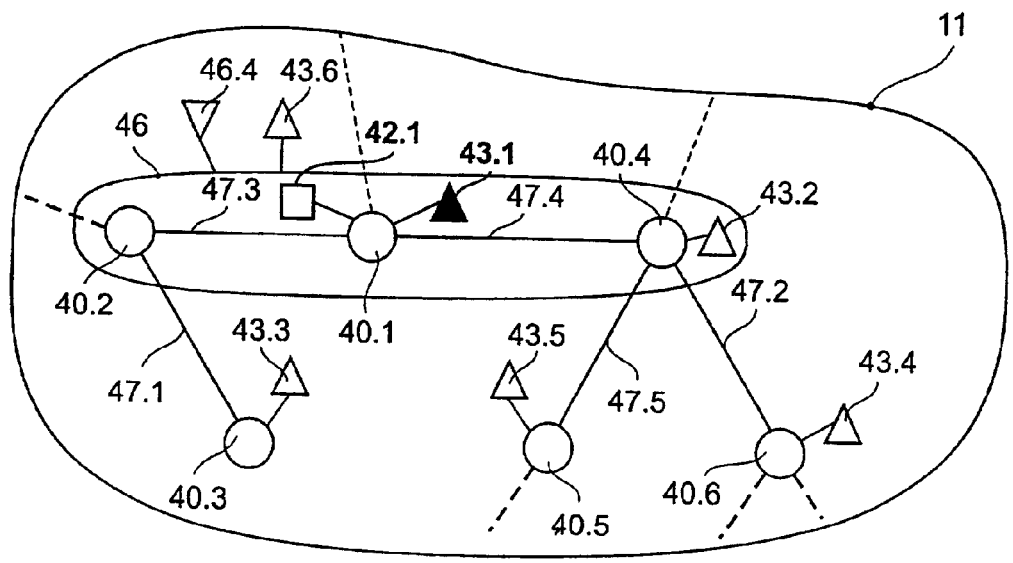
Figure 4A:
Figure 4A:
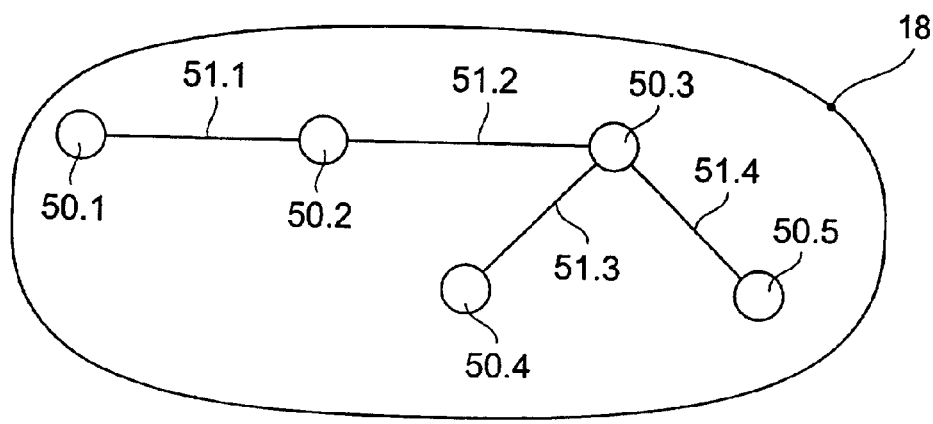

According to the present invention, objects $50.x$ and $51.x$ from an input network 18 are matched with entries (semantic units $40.x$ and $47.x$) in a knowledge database 11 in order to be able to enrich the input network 18 by classifying and segmenting/structuring it, as schematically illustrated in FIGS. 1 and 4A. By applying knowledge stored in this knowledge database 11, one is able to get an understanding of what is conveyed or represented by such an input network 18. Usually, there is some sort of an input string 12 that needs to be processed. Such an input string 12 may be generated by a speech recognition system that automatically turns the speech input into some sort of a string 12. If no input network 18 is available, a respective input network 18 has to be generated from the input string 12. This can be done by means of a semantic network generator 17, as described in co-pending European patent application entitled "Fractal Semantic Network Generator". This co-pending patent application is filed on the same day and is assigned to the assignee of the instant application. Alternatively, it can be done in a very simple fashion by creating a semantic unit for each word in the input string, and connecting these semantic units with connections labeled "next".

The term network is herein used to describe a collection or aggregation of entries/elements. These entries/elements are—at least to some extent—connected/linked by pointers or connection objects. Pointers or connection objects are semantic units themselves. A simple example of a network (input network 18) is given in FIG. 4A below the dashed line 45. In this example, the network 18 comprises five objects 50.1–50.5 and four pointers 51.1–51.4 (i.e., nine semantic units).

We continue with the basic definitions of semantic and hierarchical networks.

A semantic network is a directed or non-directed graph with the additional property that its nodes and pointers carry semantic information. Nodes and pointers of a semantic network are called semantic units. The semantic information provides a particular meaning for a semantic unit. Frequently, semantic information is encoded in natural language, i.e. specific names or modules are used to label semantic units.

A hierarchical network is a directed or non-directed graph with the additional property that some of its pointers carry scaling information. This means that one of the nodes connected to a scaling pointer is at a higher level of hierarchy than the other node.

It should be noted that this definition does not yield an absolute value for the level of hierarchy, i.e. it does not assign to every node an integer that corresponds to its level of hierarchy. Instead it gives a relative definition for the level of hierarchy.

As discussed above, the knowledge database 11 is of hierarchical and semantical nature and all elements are alike, so that the knowledge database 11 has a fractal structure, i.e., it is self-similar across hierarchies. Algorithms can operate on elements at any hierarchical level in the same way, making them 'fractal' algorithms, as briefly and in very general terms addressed in the PCT Patent application WO 99/63455.

This knowledge database 11 is a crucial component of the present invention. It has a unique structure which is described in the PCT Patent application WO 99/63455. All elements and aspects of the knowledge database 11 that are relevant for the understanding of the present invention are addressed below.

Knowledge database: A knowledge database is a kind of library describing the knowledge of the world, or a particular area of interest thereof, by using a fractal semantic network structure with local pervasive intelligence.

When referring to a knowledge database, either a library describing knowledge of the world, or a library with domain specific information is meant, or a mixture of both. An example of a domain specific knowledge database is a database which comprises knowledge relevant for the processing of insurance claims.

The knowledge database reflects the knowledge of the world or the knowledge of a certain domain or field. The content of this knowledge database always forms a subset of the content of the real world, corresponding to a limited life experience of the computer and the human being who programmed the computer. A knowledge database can be expanded either by automated learning from analyzed input, or by adding separately obtained sub-worlds (e.g. in the form of application-specific modules). It is conceivable to provide updates for the knowledge database through an intranet or internet.

The structured representation of aspects of the world with the knowledge database is achieved by a multi-scale approach related to the work of B. Mandelbrot and K. Wilson. Self-similar representations are used on different scales to describe the behavior of elements in a dynamical hierarchical network, as will be addressed in connection with an example (see FIGS. 4A–4F).

Furthermore, self-similar local algorithms are used when making use of the knowledge contained in this database.

Semantic units: A semantic unit is an element that contains one or several pieces of information. It may be represented by a word, an object, a relation, an attribute, a module, a combination of words and/or objects and/or relations and/or attributes and/or modules, a (hierarchical) network of words and/or objects and/or relations and/or attributes and/or modules, a part of a sentence or a whole sentence, a part of a paragraph or a whole paragraph, or a part of a story or a whole story.

Figure 2B:
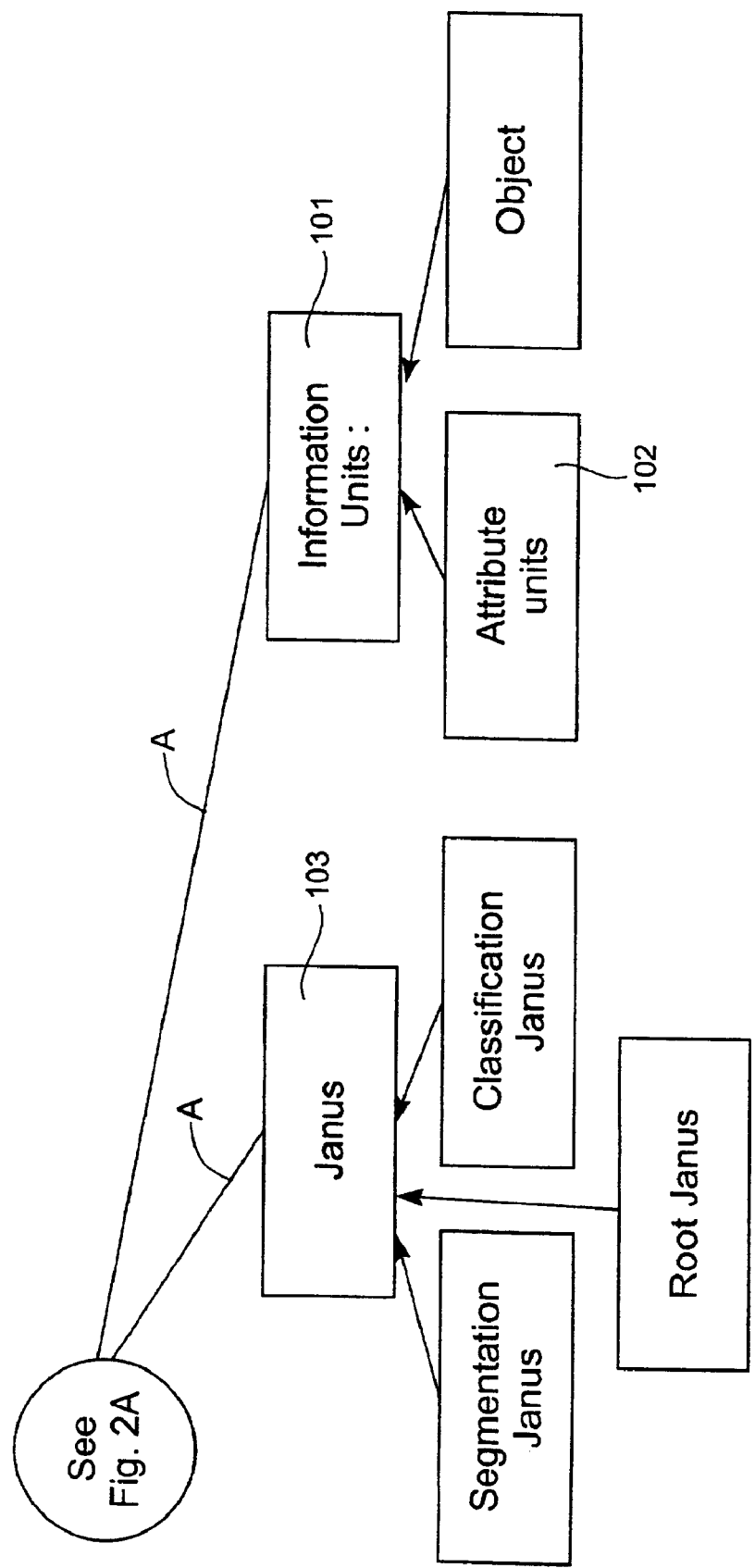

Exemplary types of semantic units and their possible mutual connections are schematically illustrated in FIGS. 2A and 2B. The knowledge database may comprise the semantic units illustrated in these Figures.

A semantic hierarchical network may have cycles (loops) of hierarchical pointers. This conflict exists only on a global scale and can be resolved if one considers only local neighborhoods of the whole network at any one time. Local neighborhoods are introduced by the notion of a topology.

A topological network is a directed or non-directed graph with the additional property that for every node and every pointer one or several local neighborhoods are defined. The local neighborhoods of a node or a pointer are sets (topology tables) consisting of this node or pointer and other nodes or pointers of the network.

Topological networks can be obtained by assigning a weight (e.g., a value between 0 and 1) to every pointer of the network. The negative logarithm of this weight then yields a metric or distance function on the network. The local neighborhoods may be defined with the help of some threshold mechanism applied to this metric.

In the special case of semantic networks it is often required that a semantic unit be used both as a node and as a pointer. For example, a semantic unit labeled friendship can be viewed both as a node ("friendship is in particular a relation", here it is a node connected hierarchically to the node relation) and as a pointer ("friendship between two people", here it is a pointer between the two nodes representing the two people). This gives rise to the following definition.

A higher-order network is a directed or non-directed graph in which pointers can at the same time be nodes. This means that a pointer can connect two nodes, one node and one pointer, or two pointers.

As stated above, one may use a topology for the knowledge database in order to have a local neighborhood structure on the knowledge database. A local neighborhood of a semantic unit in the knowledge database is given by a set of semantic units and pointers which may be grouped into a segment (e.g., segment 31 in FIG. 3A). Preferably, this is done by assigning a topology table 32.x to some or all of the semantic units 30.x in the knowledge database 11 and a topology table 34.x to some or all of the pointers 33.x. A topology table 32.x or 34.x in the present context is used as a synonym for an aggregation of information describing all local neighborhoods of a semantic unit or pointer. The collection of all topology tables defines for the topology that is superimposed on the knowledge database 11.

Figures 3A, 3B:
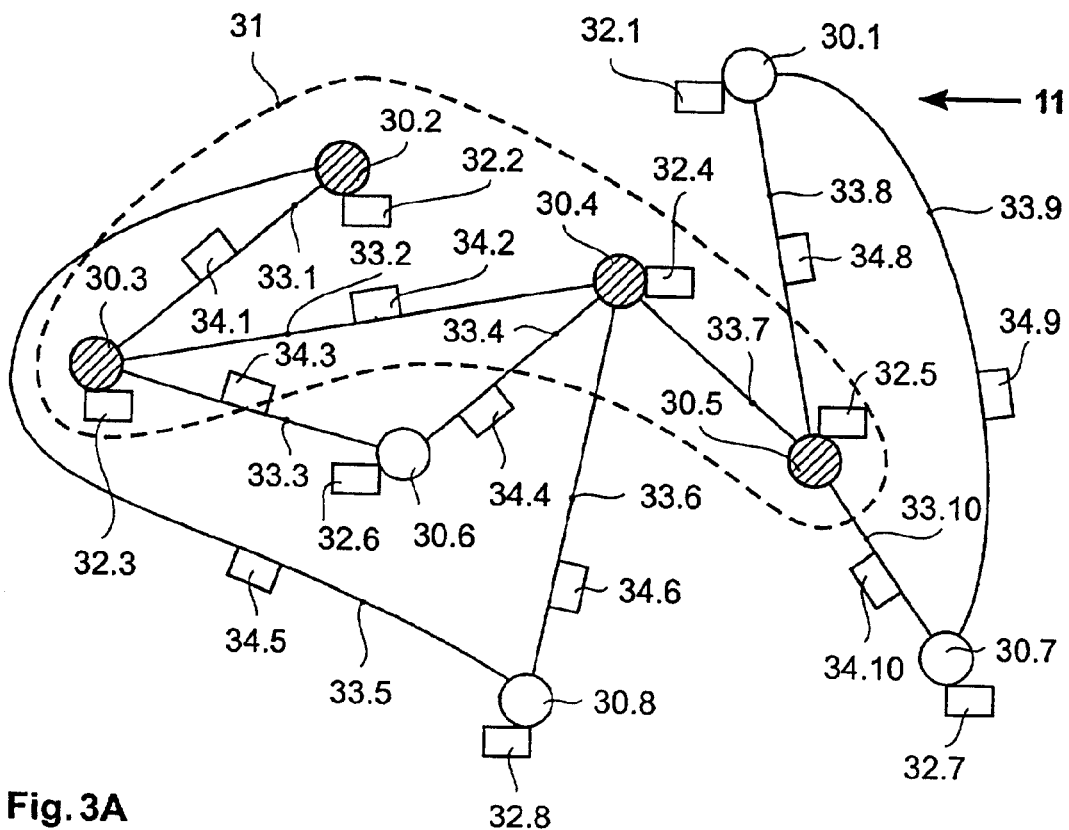
FIG. 3A shows part of a fractal semantic knowledge database, according to the present invention.
FIG. 3B is a schematic topology table, according to the present invention.

A simple example of a knowledge database 11 is illustrated in FIG. 3A. The semantic units 30.1–30.8 are represented by circles and the pointers by lines 33.1–33.10. In this example, each semantic unit 30.1–30.8 and pointer 33.1–33.10 has a corresponding topology table 32.1–32.8 and 34.1–34.10, respectively. The four hatched semantic units 30.2, 30.3, 30.4, and 30.5 all belong to a segment 31. Each semantic unit 30.x and each pointer 33.x that has a topology table 32.x or 34.x assigned knows through this topology table what its local neighborhoods look like.

A topology table 32.x or 34.x may for example comprise information concerning all neighbors within a certain semantical distance, or all neighbors that can be reached without having to pass more than k pointers (with k<4, for example). It may also comprise a completely arbitrary collection of neighbors. A schematic representation of a topology table 32.3 is shown in FIG. 3B. In this example, the local neighborhood m=1 consists of all semantic units and pointers of segment 31, the local neighborhood m=2 consist of semantic units 30.2, 30.6, and pointers 33.1 and 33.3, while the local neighborhood m=3 consists of semantic units 30.2, 30.6, 30.7, and pointers 33.1, 33.3, and 33.8.

It is also possible to keep information derived or inherited from other semantic units in the topology table. Many other approaches for the definition of a topology table's contents are conceivable: all neighbors that can be reached via one particular type of connection object, for example, can be listed in a topology table; all semantic units that have the same string of letters, e.g. the same word stem, could be listed in the topology table; and so forth.

One can logically subdivide the knowledge database into segments. There can be an overlap between various segments. The topology and segments can be independent from each other.

In the next definitions it is captured what is meant by a fractal network. A working definition is given which will suffice for the scope of the present description. In particular, the presently used formulation allows us more easily to define the self-organizing fractal semantic network and to understand the various embodiments and implementation details given.

A fractal network is a hierarchical network with the additional property that all of its nodes and pointers are derived from a small set of basic building blocks. In this sense a fractal network exhibits a self-similar structure because it looks the same everywhere on all levels of hierarchy.

The following definition deals with the modules that perform the self-organization of the network.

A (locally) self-organizing network is a directed or non-directed graph with the additional property that at least some of its nodes and pointers are connected to one or several (local) modules out of a set of modules. A module is an algorithm that performs a transformation of the network, while a local module is an algorithm that performs a transformation of the network only in the local neighborhood of the node or pointer it is connected to. The (local) modules are triggered by the state of the node or pointer they are connected to, which in turn is a function of the entire network.

For practical purposes the state of a node or pointer is often only a function of its local neighborhood. For example, when dealing with semantic networks a semantic unit is often connected to attributes, and the values of these attributes determine the state of the semantic unit.

After making all of the above definitions we are now in the position to define a self-organizing fractal semantic network, the fundamental model that we use in the present context.

A (locally) self-organizing fractal semantic network is a hierarchical, topological, higher-order, fractal, (locally) self-organizing semantic network.

In the following sections a set of basic building blocks and basic modules are defined, which are used to construct self-organizing fractal semantic networks.

As specified above, nodes and pointers of a network are called semantic units (cf. FIGS. 2A and 2B). All semantic units 100 are subdivided into concepts and instances. We further subdivide nodes into information units 101, attribute units 102, and module units or Janus Objects 103 and connection units or objects 104. Information units are general elements that can represent concepts or instances, and they are identified by specific names. Attribute units 102 are identified by specific names and values, which can be set, retrieved, or computed.

All pointers of the network (connection objects 104) are either scaling (hierarchical connections 105) or non-scaling (non-hierarchical connections 106). Standard inheritance principles are defined across all scaling pointers, making use of the network's topology or neighborhood concept. Pointers are further subdivided into comparison units 107, 109, interaction units 108, 110, description units 111, role units 112, and controller units 113. Non-scaling comparison units 109 allow us to describe the degree of similarity or dissimilarity of two semantic units, while scaling comparison units 107 allow us to describe how close one semantic unit comes to being an instance of another semantic unit, or how close one semantic unit comes to being a special case of another semantic unit. Non-scaling interaction units 110 allow us to describe the type of interaction of two semantic units, while scaling interaction units 108 allow us to describe the role one semantic unit plays as part of another semantic unit. Description units connect semantic units to their attribute units, which describe the semantic units in more detail. Role units describe the role one semantic unit plays with respect to another semantic unit. Finally, controller units connect semantic units to their Janus Objects 103, which in turn control and act upon the semantic units' local neighborhoods.

Figure 6:
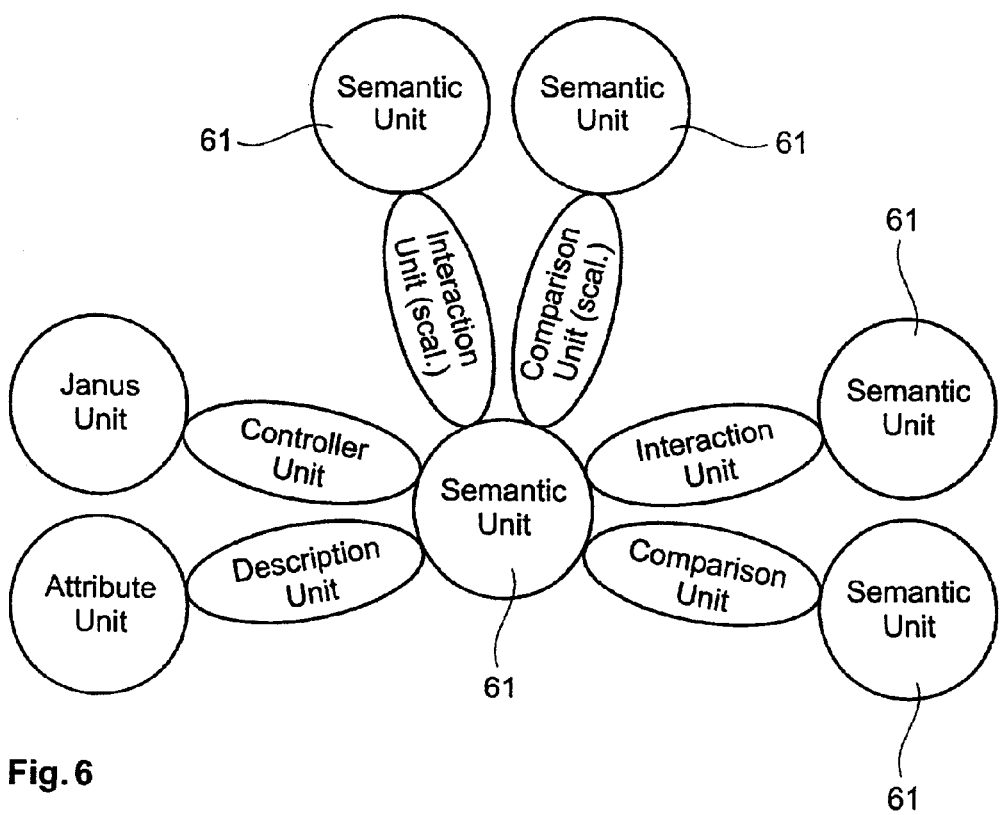
FIG. 6 shows the basic building blocks of a network, according to the present invention.

FIG. 6 shows how the basic building blocks are used to construct a network. Note that each building block 61 labeled "Semantic Unit" can be replaced with any basic building block. Information units do not appear in this FIG. 6, as there is no restriction on their use. In practice most of the building blocks 61 labeled "Semantic Unit" are information units.

A pointer 42.1 from a semantic unit 50.1 (herein referred to as object in order to be able to make a clear distinction between semantic units of the input network 18 and semantic units of the knowledge database 11) of the input network 18 to a semantic unit 40.3 in the knowledge database 11 may carry a confidence value Cx. These pointers 42.x (cf. FIGS. 4A–4F and FIG. 5) are herein referred to as "classification connections". If such a classification connection 42.x carries a confidence value Cx it corresponds to the classification probability, i.e. the probability that the object 50.1 from the input network 18 has been correctly matched with a semantic unit 40.3 in the knowledge database 11.

As described above, the knowledge database 11 used in the present context is a fractal semantic network of semantic units with local pervasive intelligence.

In accordance with the definition above, a network is called a fractal semantic network, if the following four conditions are satisfied:

All nodes are similar (derived from one template) across all hierarchies.

All pointers are similar (derived from one template) across all hierarchies.

Pointers may also be nodes across all hierarchies.

Hierarchical pointers are possible, and at least one node must have a hierarchical pointer.

The construction of a fractal semantic network can be achieved as follows. The network is given by a list of semantic units 100, some of which are pointers (connection objects 104), as illustrated in FIGS. 2A and 2B. There might be different types of semantic units (as defined above) and pointers (similarity pointers 107, 109, functional pointers 108, 110, attribute pointers 111, and role pointers 112, also defined above). These pointers can be oriented upwards, downwards, or horizontally. The various semantic units 100 are interconnected in various ways. Some of the pointers (105) are hierarchical representing the multi-scale approach. Knowledge is presented in the knowledge database 11 as an associative network.

A semantic unit may be linked by associative pointers to its associative semantic unit(s). These associative pointers reflect how one understands each semantic unit. It is important to note that these pointers can exist between any two semantic units. The pointers themselves are regarded as semantic units that can have pointers to other semantic units, reflecting the fact that something could act on the association between two semantic units rather than on the individual semantic units. Due to the fractal organization of the knowledge database, as outlined above, the otherwise very complex and rich structure of the world is significantly simplified.

This also greatly simplifies the task of trying to understand the information conveyed in some input string 12 or input network 18, as will be addressed now.

Using knowledge from the knowledge database 11 in order to enrich the information originally contained in an input network 18 can be done in a very efficient manner due to the fact that the network is fractal and thus self-similar across hierarchies. Using a local and iterative approach—as described hereinafter—one can use the knowledge contained in the knowledge database 11 to perform the understanding task of what is conveyed in the input string 12. The key is that this is done locally, making use of the fractal structure of the knowledge database 11, triggered by elements of the input network 18.

The herein proposed schemes and systems are based on the above-described special model of textual information and natural language. According to this model, natural language as well as textual information consists of semantic units which are grouped at different levels of hierarchy and are all of a similar type.

According to the present invention, it is advantageous to generate an input network 18 out of an input string 12 that also has a fractal semantic network structure like the knowledge database 11. Preferably, the knowledge database 11 and the input network 18 are all represented in what is called a higher-order fractal semantic network. The input network 18 of a speech input 12 or a question may be created by locating its semantic units, possible relations, possible attributes, and possible roles by using a parser that performs a deep syntactic and a shallow semantic analysis. The meaning understanding scheme presented herein yields a resulting semantic network (with a multitude of connections to the knowledge database) which can be used to generate a meaningful output 15, e.g., an answer or reaction.

The presently described meaning understanding process bridges or merges two networks, the input network 18 and the knowledge database 11. The whole meaning understanding process is a process that is divided into an initialization phase and a subsequent iteration phase. The initialization may comprise two steps. According to the hereinafter described embodiments, the iteration also comprises two steps.

Step one of the iteration is called Classification and is carried out by Classification Jani, while step two of the iteration is called Segmentation and is carried out by Segmentation Jani.

There are different ways to initialize the process. One advantageous way of initialization is described in the following sections. Another approach is described towards the end of this description.

During step 1 of the initialization, all objects of the input network 18 are regarded as unknown. They are thus attached via some initial classification connection to initial semantic units in the knowledge database 11 that are meant to be question marks, unspecified semantic units, or similar units that are within a category that is regarded as unknown. In other words, all objects may be connected to dummy semantic units. These kind of semantic units are herein referred to as Root Objects (root semantic units). A Root Object may have a Root Janus.

In step 2 of the initialization some or all objects of the input network 18 inherit the Root Janus from the Root Object that they are attached to by their initial classification connection from step 1. Then for some or all of the objects the Root Jani get activated and refine the unspecified (initial) classification connections. An activated Root Janus tries to create one or several 'real' classification connections to semantic units in the knowledge database that are deemed to be related to the object of the input network 18, e.g., by analyzing word characteristics such as letter sequences or frequency spectra. This may include the matching of possibly misspelled words or typographical errors. Based on whether this $2^{nd}$ step is successful, the confidence values Cx (see one of the later sections) of the classification connections may be adjusted accordingly to preliminary values (this is a heuristic process).

For the purpose of the present description, it is assumed that there is an input network 18 that has several self-similar semantic units (objects) connected by pointers (see for example the input network 18 in FIG. 4A). Preferably, the input network 18 exhibits a hierarchical structure. The generation of such an input network 18 out of an input string 12, e.g. an unstructured sequence of words, is addressed in the co-pending patent application mentioned above, filed on the same day as the instant patent application.

It is one goal of the present scheme to turn the input network 18 into a fractal semantic network structure that is comparable with the knowledge database's structure. In doing so, context is taken into account across a multitude of scales. The result is thus more reliable with respect to a correct understanding of the input's meaning than any process that uses just one level of hierarchy.

During the initialization process described above, initial classification connections are established between objects of the input network 18 and semantic units of the knowledge database 11. An example of an input network 18 and a knowledge database 11 after completion of an initialization process is illustrated in FIG. 4A. The input network 18 (below the dashed line 45) comprises five objects 50.1–50.5. These objects are connected by pointers 51.1–51.4.

Figure 4B:
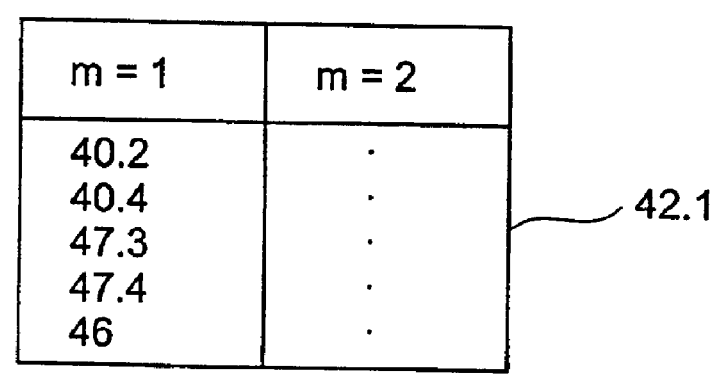
Figure 4C:
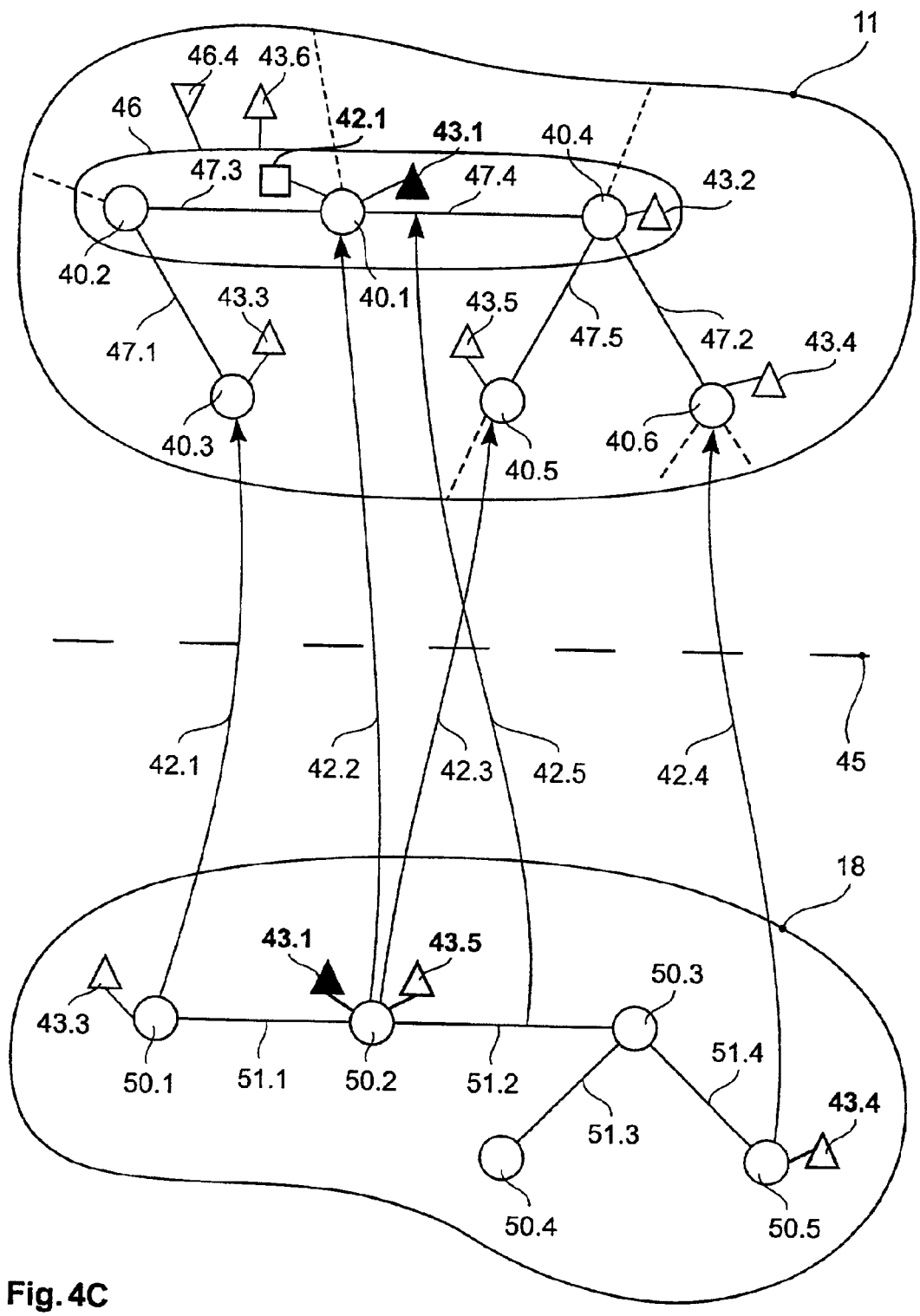

During the initialization process described above, one compares the objects 50.1–50.5 and pointers 51.1–51.4 of the input network 18 with semantic units 40.1–40.5 and pointers 47.1–47.5 of the knowledge database 11 in order to find counterpart elements in this knowledge database 11. There are different ways of finding counterpart elements. One can, for example, do a simple string match where the string associated with an object 50.$x$ or pointer 51.$x$ in the input network 18 is compared to the strings associated with the semantic units 40.$x$ or pointers 47.$x$ in the knowledge database 11. Here is a simple example; assuming that the object 50.1 carries the string "car", a string matching algorithm is employed that searches the knowledge database 11 for strings that comprise the word "car". If the semantic unit 40.3 carries the name "car", then this particular semantic unit 40.3 is deemed to be a counterpart element. After such a counterpart element was found, a classification connection 42.1 is established between the object 50.1 and the semantic unit 40.3, as shown in FIG. 4C. Note that the simple string matching procedure can be generalized to a fuzzy string matching procedure, allowing to even compare word fragments or identify misspelled words. In the present example, just one counterpart element, namely 40.3, was found for 50.1. The object 50.2 has two counterpart elements 40.1 and 40.5 (cf. classification connections 42.2 and 42.3), the object 50.3 has no counterpart element, the object 50.4 has no counterpart element, and the object 50.5 has just one counterpart element 40.4 (cf. classification connection 42.4). Note that also one of the pointers of the input network 18, namely pointer 51.2 has a counterpart element 47.4 in the knowledge database 11. A corresponding classification connection 42.5 is thus established between pointer 51.2 and pointer 47.4.

Instead of the string matching approach one can use a partial string matching approach, a fuzzy string matching approach, or the like. One can also employ an algorithm that analyzes word characteristics such as letter sequences or frequency spectra.

Optionally, one can employ one or more dummy elements which are similar or the same as the Root Object in the knowledge database 11. One may establish classification connections from those objects in the input network 18 that do not have any counterpart elements in the knowledge database 11 to these dummy elements. This is not illustrated in any of the Figures.

Referring now to FIGS. 4C–4F, the underlying principle of the iteration process is outlined.

The first step of the iteration process is called the classification step. As mentioned further above, the process of Classification stands for the task of comparing one semantic unit to others. This is done in order to find comparable semantic units in the sense that they are alike, can perform similar tasks, have similar goals, are more general or more specific, are constituents or segments, or are in similar states, among other things. According to the present invention, the process of Classification is performed through an extensive local neighborhood analysis. This means that the degree of similarity of two semantic units is determined by the degree of similarity of their local neighborhoods with respect to the above comparison factors. As with determining the status of a semantic unit, when comparing semantic units it may not be enough to take into account the values of the attribute units of these semantic units. Instead, the topology of the network, i.e. the entire local neighborhood structures of the semantic units, may be considered. Therefore, an advantageous implementation of the process of Classification deals with the more general task of finding similar structures in the input network 18 and the knowledge database 18 and not just similar values of attribute units. Because of the self-similar structure of the networks 11 and 18, this Classification process can be implemented in a generic way, thus allowing the Classification Janus to be used throughout the entire network.

During this classification step objects 50.$x$ and pointers 51.$x$ of the input network 18 inherit across all their classification connections 42.$x$ the Classification Jani 43.$x$ that are attached to the counterpart elements 40.$x$. That is, during this classification step one copies the Classification Jani 43.$x$ that are associated with the counterpart elements 40.$x$, 47.$x$ from these elements to the corresponding objects 50.$x$, 51.$x$ in the input network 18. The Classification Jani 43.$x$ are illustrated by little triangles. This classification step is illustrated in FIG. 4C. Note that the pointers 47.$x$ may carry Classification Jani 43.$x$, too. In the present example, however, only the semantic units 40.$x$ carry Classification Jani 43.$x$.

In our example, the counterpart element 40.3 carries a Classification Janus 43.3. Since the counterpart element 40.3 is connected via the classification connection 42.1 to the object 50.1, the Classification Janus 43.3 is copied to this object 50.1. As shown in FIG. 4C, the object 50.1 now carries a copy of the Classification Janus 43.3. The counterpart element 40.6 is connected via the classification connection 42.4 to the object 50.5 and the Classification Janus 43.4 is copied to this object 50.5. The object 50.2 is an exception since this particular object is connected by two classification connections 42.2 and 42.3 to two counterpart elements 40.1 and 40.5. In such a case, the object 50.2 inherits the Classification Jani of all counterpart elements 40.1 and 40.5. That is, the two Classification Jani 43.1 and 43.5 are both copied to the object 50.2. After the Classification step is completed, an object 50.$x$, 51.$x$ in the input network 18 may carry k Classification Jani 43.$x$, with k=0, 1, 2, . . . .

Some or all of the Classification Jani 43.$x$ perform—after having been triggered—local neighborhood analyses on the hierarchical level of their original locations in the knowledge database 11, i.e., they examine the local neighborhood structure in the knowledge database 11, such as roles or mandatory neighbors, and try to find similar structures in the neighborhood of the input network 18. Here they use the topology defined in the knowledge database 11 (by means of topology tables 32.$x$; 42.1) to determine the neighborhoods within which they conduct their analyses.

FIG. 4B shows the topology table 42.1 of semantic unit 40.1. In addition, some or all of the Classification Jani 43.$x$ may perform so-called upward segment neighborhood analyses in order to find neighbors which belong together because they are parts of entities on a higher scale. These upward neighbors may also represent more general descriptions of the semantic units in question. This helps to identify objects 50.x (or pointers 51.x) in the input network 18 that appear in multiple places. Overall successful upward segment neighborhood analysis gives an indication that the right meaning for the input constituents (objects 50.x and/or pointers 51.x) has been found in the knowledge database 11.

Note that usually the objects 50.x of the input network 18 do not carry any Classification Jani, before the classification step is initiated. The objects 50.x may carry Root Jani though.

Inheritance may also be interwoven with the classification step. For this purpose, objects 50.x and/or pointers 51.x may inherit attributes and/or relations from semantic units 40.x and/or pointers 47.x above it in hierarchy. The Classification Jani 43.x could for example examine the result(s) of an upward segment neighborhood analysis performed to find semantic units 40.x in the knowledge database 11 which belong to a segment on a higher level of hierarchy. For example, if an attribute is connected to a semantic unit 40.x, a descendant semantic unit, i.e., one that is below in hierarchy, is implicitly allowed to have the same attribute(s). This carries over through classification connections 42.x to objects 50.x and/or pointers 51.x in the input network 18. Let us assume that there is a semantic unit "car" and that this unit belongs to a semantic unit "vehicle" above in hierarchy. The semantic unit "vehicle" has the attribute "mobile". The semantic unit "car" now inherits this attribute since the car is mobile, too. This attribute "mobile" now carries over through a classification connection 42.x to respective object 50.x in the input network 18. In doing so, the input network 18 is enriched with knowledge from the knowledge database 11.

Similarly, values of attributes may get inherited across hierarchies, where values are usually taken from the semantic unit closest to the one in question, as they can be regarded as more similar than units further away in hierarchy. For certain scaling or hierarchical connections 105 (is-in-particular connections or hierarchical similarity connections 107) roles or other closely linked neighbors can also be inherited.

During this inheritance step, some or all of the objects 50.x and/or pointers 51.x in the input network 18 may inherit across some or all of their classification connections 42.x the Classification Jani 43.x that are attached to the counterpart elements 40.x and/or 47.x in the knowledge database 11.

Note that the optional inheritance step and the classification step may at least to some extent be carried out concurrently.

Continuing with our example, the Classification Janus 43.1 copied to the semantic unit 50.2 performs the neighborhood analysis as follows. First it examines the counterpart unit's topology table 42.1. The topology table 42.1 is illustrated in FIG. 4B. It finds that the semantic units 40.2 and 40.4 and the pointers 47.3 and 47.4, together with the semantic unit 46, form one local neighborhood, which happens to be the segment of the semantic unit 46. It now verifies whether these elements are counterparts of any of the elements of the input network 18. It finds that pointer 51.2 has counterpart pointer 47.4 through the classification connection 42.5. However, none of the other semantic units listed in the topology table are counterparts of elements of the input network 18. The search described in this paragraph is later referred to as the "bottom-up approach".

Next, the semantic unit 46 is the segment that the semantic unit 40.1 belongs to, and the semantic unit 46 has a Classification Janus 43.6 attached. Therefore, this Classification Janus 43.6 is copied to the element 50.2 (cf. FIG. 4D).

The Classification Janus 43.6 is triggered and performs a search later referred to as the "top-down approach". This is done as follows. First it finds that the element 50.1 is classified as semantic unit 40.3 (through the classification connection 42.1), which in turn is a special kind of semantic unit 40.2 (through the connection 47.1). Therefore, the semantic unit 40.2 is also (by inheritance) a counterpart of element 50.1. Then, it finds that the pointer 51.1 connects the objects 50.1 and 50.2. Thus, it creates a classification connection 42.7 between pointer 51.1 and pointer 47.3, the connection between the counterpart elements of 50.1 and 50.2. Finally, it finds that the object 50.3 is connected through the pointer 51.2 to the element 50.2, and the pointer 51.2 has counterpart pointer 47.4 through the classification connection 42.5. Therefore, it creates a classification connection 42.6 from the element 50.3 to the counterpart element 40.4.

The Classification Janus 43.4 also performs a bottom-up search, which leads to the classification connection 42.9 between pointer 51.4 and pointer 47.2. Classification Jani 43.3 and 43.5 execute without any result.

Figure 4D:
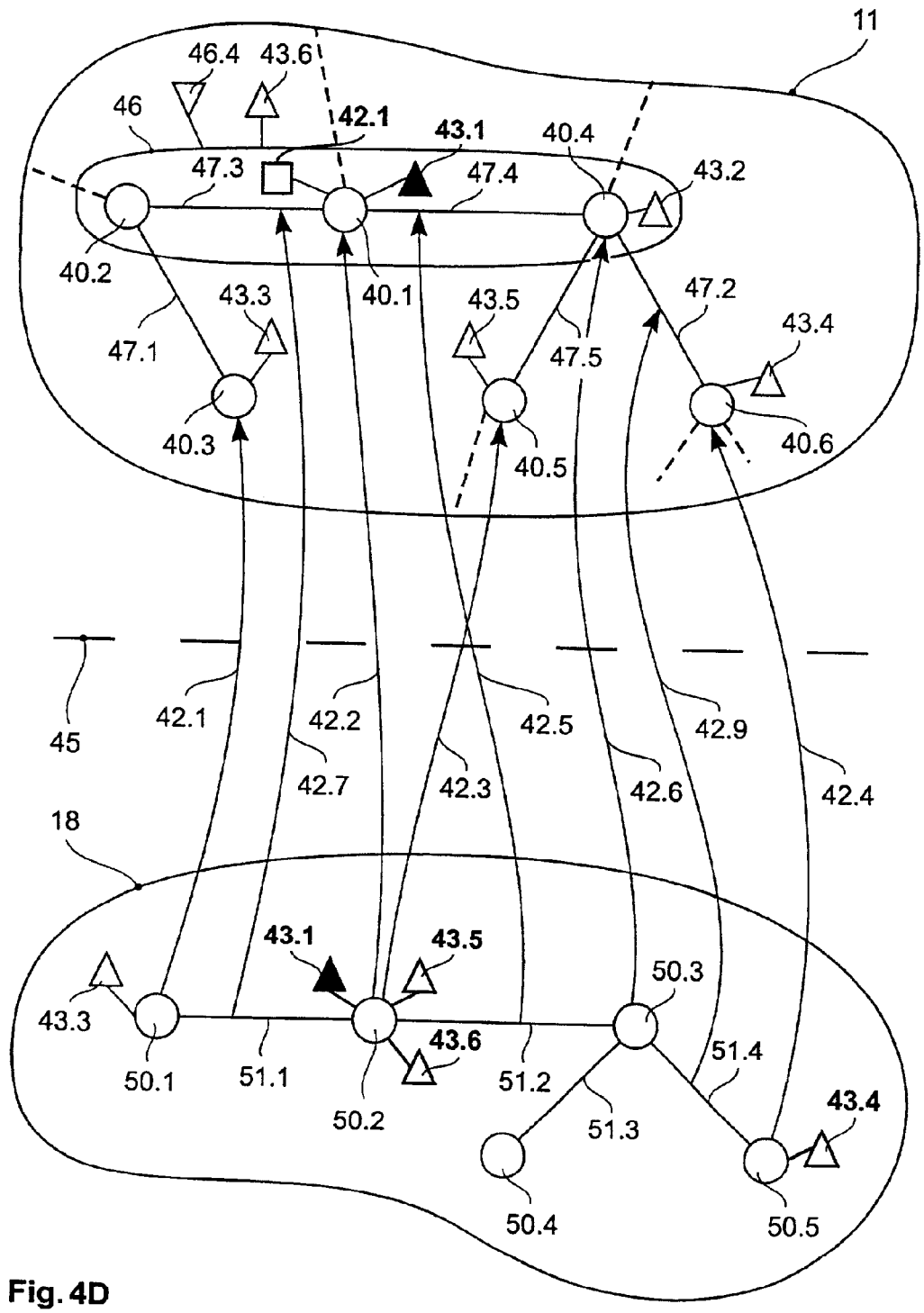

The result of this $1^{st}$ iteration of the classification process is shown in FIG. 4D. Now that all Classification Jani 43.x have finished their task, the Segmentation Janus 46.4 gets triggered. Note that the Classification Jani 43.x could have performed most or all of their tasks in parallel.

Figure 4E:
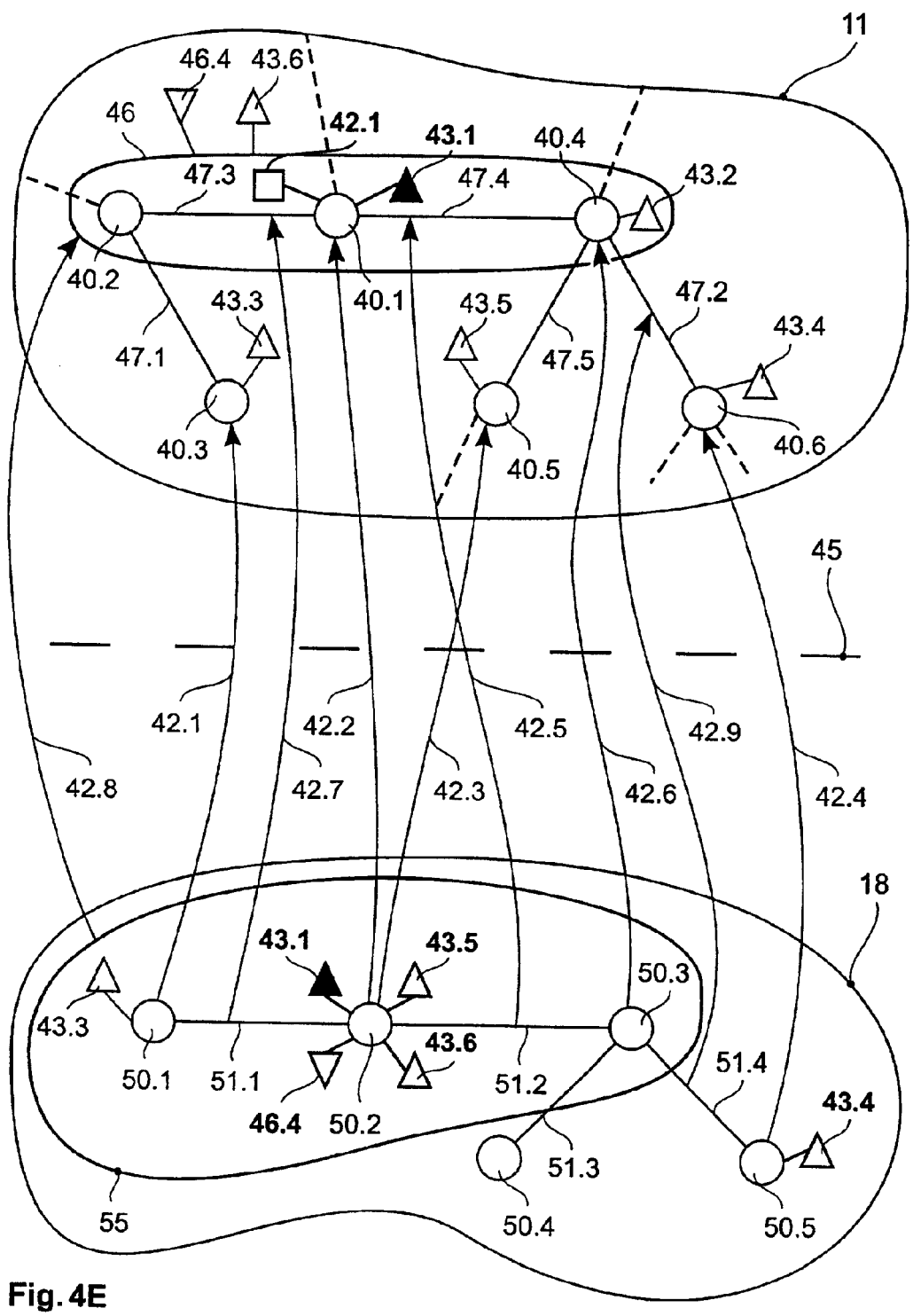

The Segmentation Janus 46.4 verifies that all semantic units of the segment 46, that is, the semantic units 40.1, 40.2, 40.4, 47.3, and 47.4, are counterparts of the elements in the input network 18. In addition, the connection structure among these input elements is the same as the connection structure among the semantic units of the segment 46. Therefore, the Segmentation Janus 46.4 creates a new segment 55 in the input network 18. Furthermore, it creates a classification connection 42.8 of the segment 55 to the segment 46. The result of this $1^{st}$ iteration of the segmentation process is shown in FIG. 4E.

Figure 4F:
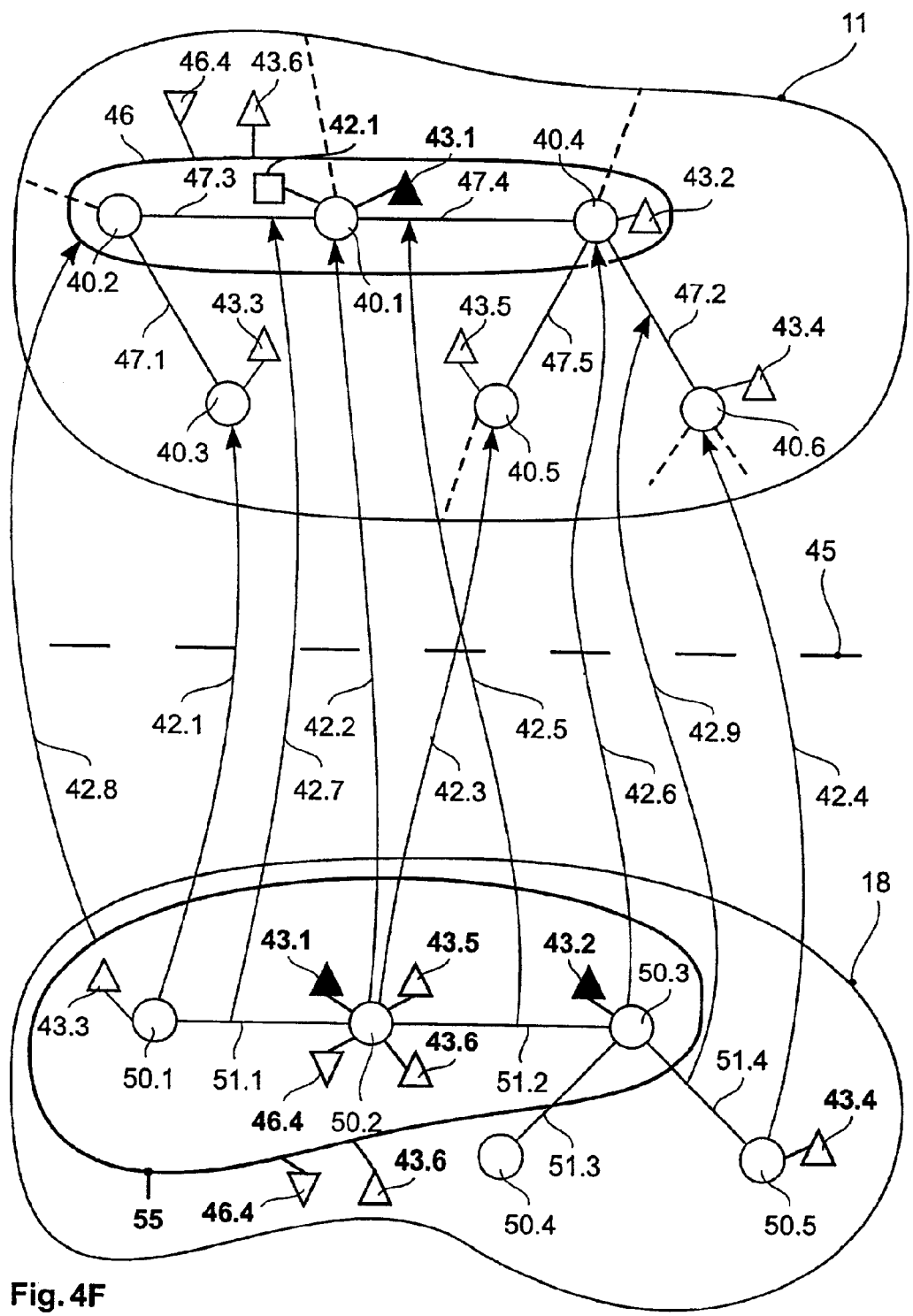

Next follows the second iteration. The Classification Jani 43.2 and 43.6 and the Segmentation Janus 46.4 get copied through the newly created classification connections to the elements 50.3 and 55, respectively. This is illustrated in FIG. 4F. Some or all Classification Jani 43.x get triggered again. This time, the confidence values Cx for the classification connections 42.1, 42.2, 42.5, 42.6, 42.7, and 42.8 get increased because of the correctly classified segment structure. At the same time, the confidence value Cx for the classification connection 42.3 gets decreased because its neighborhood structure could not be classified correctly. It is now more likely that the semantic unit 40.1 is the correct counterpart of the element 50.2, while the semantic unit 40.5 is not.

Note that if the semantic unit 40.4 has a topology table which includes the semantic unit 40.6 and the pointer 47.2, then the confidence values Cx that the elements 50.3, 50.5, and 51.4 are classified correctly are again increased, because the connection structure among these elements is the same as the connection structure among their counterpart semantic units in the knowledge database 11.

The objects 50.x of the input network 18 can also be segmented if it is determined (e.g., by anaphora resolution) that they correspond to the same instance in the input string 12.

The segment units (e.g., unit 55 in FIG. 4F) may have Classification Jani 43.x and Segmentation Jani 46.x attached to themselves. As mentioned above, the meaning understanding process, according to the present invention, then continues by iterating through the above-described classification step (1st step of the iteration) and segmentation step (2nd step of the iteration). That is, the segment's classification connections receive confidence values Cx which depend on the confidence values Cx of the classification connections of their constituents and vice versa. The constituents (e.g., semantic units 40.1, 40.2, 40.4, 47.3, and 47.4) of a segment (e.g., 46) may get re-classified depending on the segment that they belong to. Finally, segments may be grouped into segments on yet higher scales. The semantic units "car" and "airplane" belong to the segment "vehicle" and the segment "vehicle" may belong to a segment "man-made machine" on a higher scale, and so forth.

Figure 5:
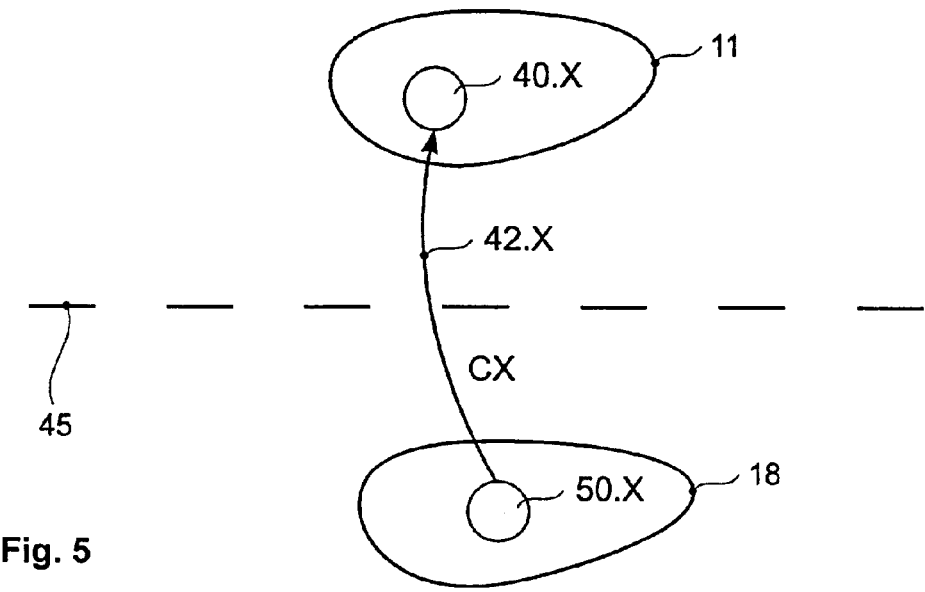
FIG. 5 shows a classification connection between an object in an input network and a semantic unit in a knowledge database, according to the present invention.

A classification connection 42.x may receive a confidence value Cx which quantifies to what extent the object 50.x or 51.x of the input network 18 and the counterpart element 40.x or 47.x of the knowledge database 11 are deemed to be related, as schematically illustrated in FIG. 5. This value Cx may change throughout the whole classification step and/or the segmentation step and can be the same parameter as the weight factor on pointers, as described by the PCT Patent application WO 99/63455, International Application No.: PCT/IB99/00231, entitled "Processing of Textual Information and Automated Apprehension of Information". In the present embodiment, this confidence value Cx is incremented as the likelihood that the respective connection is a valid one increases. That is, the larger the confidence value Cx, the better the neighborhood match of the object 50.x, 51.x and counterpart element 40.x, 47.x is. The value Cx reaches a maximum if a perfect match is established. In an alternative implementation, the confidence value Cx may be decremented instead, so that it reaches a minimum if a perfect connection is found.

The Classification Jani 43.x and/or the Segmentation Jani 46.x may be scheduled by a scheduler module. This scheduler module may follow certain rules. One such rule can for example define that those object of the input network 18 that represent verbs are processed with the highest priority, just to give one example. Another rule may define the order in which the various objects 50.x are processed. Yet another rule may define that filler-words, for instance, are not considered when looking for counterpart elements. Alternatively, the Jani receive importance values which are translated into relative execution time.

A Classification Janus 43.x knows where it originally comes from. The Classification Janus 43.3 that is attached to the object 50.1 in the input network (cf. FIG. 4C, for example), remembers that its original is attached to the semantic unit 40.3. Furthermore, a Classification Janus 43.x is able to compare the new neighborhood in the input network 18 with the neighborhood in the knowledge database 11. This is done in order to verify whether the neighborhood is the same as the one in the knowledge database 11. If the neighborhood turns out to be the same, then it can be assumed that with a high likelihood the result of the classification was successful. That is, it is safe to assume that the respective classification connections between the objects 50.x in the input network 18 and the semantic units 40.x in the knowledge database 11 are valid, i.e., the Classification Janus 43.x was able to verify the arrangement. The respective classification connection 42.x gets a high confidence value Cx. Again, confidence values are assigned according to certain heuristics.

As outlined, a Classification Janus 43.x is able to validate whether and to what extent a neighborhood in the input network 18 resembles a neighborhood in the knowledge database 11. If a classification connection 42.x is determined to be a good one, then the classification probability (confidence value Cx) of the respective classification connection 42.x is updated.

A generic description of the tasks of a Classification Janus 43.x can include the recognition of mandatory and optional roles during the classification step by exploring the local neighborhood of the object 50.x and pointer 51.x or semantic unit 40.x and pointer 47.x to which it is attached. Thus a Classification Janus 43.x needs some knowledge about the neighborhood of its semantic unit, which it obtains by examining the neighborhood. Other tasks of the Classification Jani 43.x may be comparing the input network neighborhoods with their knowledge database neighborhoods. The results of these tasks may be used to determine the confidence value Cx of the respective classification connection(s) 42.x.

The Segmentation Janus 46.x may be designed to allow segmentation of semantic units and/or pointers, de-segmentation, fusion of two or more semantic units into one semantic unit, fission of a semantic unit into two or more parts, foundation of segments, boundary optimization with respect to segments, and so forth. In other words, a Segmentation Janus 46.x may be programmed to perform steps that facilitate the segmentation of semantic units according to similarities found during the Classification process. A Segmentation Janus 46.x may further be employed to create semantic units and/or pointers and to change values of attributes.

According to one embodiment, the classification connections 42.x never get removed. Instead, their confidence value Cx is set to a low value if the value is defined to increase if a classification gets better. Otherwise, i.e., if decrementing confidence values Cx are employed, the confidence value Cx of a bad connection is set to a high value.

Likewise, one may suppress bad classification connections 42.x (e.g., those connections whose value Cx is above or below a threshold), or one can remove bad connections.

Another embodiment—referred to as top-down segmentation—is addressed in this section. According to this embodiment, the Segmentation Jani 46.x may get activated when the semantic units of this segment are recognized as being ascendants of classified semantic units in the knowledge database 11 at a higher level of hierarchy. That is, the segmentation may take place at several levels. In this case, a new segment unit is created in the input network 18 and connected to the semantic units of the segment in the knowledge database 11 with a classification connection. In addition, all objects in the input network 18 that are classified as semantic units of the knowledge database 11 which are also ascendants of the same segment get grouped into the newly created segment in the input network 18. The confidence values Cx of the classification connection of the newly created segment may depend on the confidence values Cx of the classification connections of its constituents. This method can be optionally followed to higher scales through the hierarchy of the knowledge database 11 until the whole input network 18 is segmented into one or more segments at the highest level. The classification connections of segments at a higher level of hierarchy correspond to a more general meaning or context, while the classification connections of the individual objects in the input network 18 contain more specific information.

Another embodiment—referred to as bottom-up segmentation—is addressed in the present section. If two or more objects of the input network 18 from different parts of the input string 12 have been classified and recognized as members of a segment in the knowledge database 18, then that segment's Segmentation Janus 46.x may be triggered in order to find other possible members that may have been classified within an acceptable semantical distance. To do this, one may check the topology tables that comprise information about a semantic unit's neighborhood. Again, a new segment unit is created in the input network 18 to represent all of these objects, and it is connected to the semantic units of the segment of the knowledge database 11 with a classification connection. This newly created segment in the input network 18 may for example represent the same instance in the input network 18, which is mentioned with different names in different places of the input string 12. If the input string 12 refers in one sentence to a "car" and in another sentence to a "sedan", then it is possible that both refer to the same instance. A newly created segment in the input network 18 may for example be called "vehicle".

The bottom-up approach may co-exist with the top-down approach in the segmentation process since they may be favorable in different situations. Especially, for objects in the input network 18 that are 'far apart' but are still part of a larger segment, the bottom-up approach is probably more efficient. The above-mentioned scheduler module may have means to control whether and to what extent the bottom-up approach and the top-down approach co-exist.

One may use an elimination method in order to search for a particular word (object) that is not mentioned directly but rather as an anaphor (i.e., by a co-reference) or as a metaphor (i.e., with transferred meaning). As an example consider "I", "intersection" and "sign" mentioned in the first part of an input string 12 (e.g. a story told). If an expression like "another car" appears in the input string 12, this means that in the previous part of the string 12 a car must be present, even though it has not been mentioned explicitly. The elimination method may now search through every previously mentioned noun in order to see which one of them can be used as a metaphor for car. This is again a neighborhood analysis. In the example the result is "I" as a metaphor for car.

It is to be noted that some or all of the above processes lead to a logical segmentation. The result of the classification and segmentation processes may not necessarily be reflected in that any physical changes take place inside the input network and/or the knowledge database. The classification connections and like elements may be pointers in some table or memory space, for example.

According to the present invention a plurality of local algorithms (Jani) are employed to perform the meaning understanding task. A Janus can be viewed as some sort of a software module or object that is programmed to perform the above-described tasks. The Jani are implemented as generically as possible, making use of the self-similar structure of the knowledge database across all levels of hierarchy. Jani are executed when triggered by the semantic units they are attached to, or when invoked by other Jani.

The Jani described here are the Classification, Segmentation, and Root Janus, but it is conceivable to have many more Jani that perform a range of tasks, some more generic and some more specific. The important fact is that the network self-organizes with the help of the Jani on a local scale and not with the help of a global algorithm.

All known "holistic" approaches employ a global algorithm rather than a plurality of local algorithms to perform a meaning understanding task. This global algorithm has to be designed very carefully to include all possible cases and exceptions. Because this is almost impossible, most of the "holistic" approaches have failed, and only some of them have achieved minor successes.

A system in accordance with the present invention may comprise a processing unit 13, as illustrated in FIG. 1. This unit 13 may have one CPU or multiple CPUs. The Jani are executed in parallel on the CPU(s). Alternatively, each Janus may be its own processor which requires a completely different hardware architecture.

The advantage of the methods described and claimed herein over others is that the meaning understanding task consists of a relatively small number (small compared to the size of the knowledge database) of different Jani. These Jani perform their actions on a local scale, as opposed to a global algorithm acting on the entire network. Most of these Janus actions can even be performed in parallel. In addition, not all of the Jani have to complete their actions successfully to achieve an overall successful understanding of the meaning of the input string. Thus, the present invention is computationally feasible and terminates successfully under almost all circumstances and conditions.

As described above, the meaning understanding task according to the present invention is done by several Janus actions. According to this model, meaning understanding is performed in two steps which are repeated iteratively until the system 10 converges towards an output 15. This output 15 can be the meaning of the input string 12 or even some action or reaction. The two iteration steps incorporate the above-described Jani, the Classification Jani and the Segmentation Jani. In addition, a scheduling mechanism (e.g., implemented as a software module) may be employed to control the scheduling of the Jani.

In the embodiments described so far, a Root Janus acts as the basic or starting Janus of the system and is connected to the Root Object of the knowledge database 11. The Root Janus' main objectives may be to create string matches between objects 50.$x$ and/or pointers 51.$x$ of the input network 18 and semantic units 40.$x$ and/or pointers 47.$x$ of the knowledge database 11, collect knowledge database information, clone (copy) the Classification Jani into the input network 18, and finally trigger the cloned (copied) Classification Jani in the input network 18.

In this particular way, the Root Janus performs the first steps of cross-linking the knowledge database 11 with the input network 18, i.e., the initialization process of the two-step iteration process. By this first cross-linking the objects 50.$x$ and/or pointers 51.$x$ of the input network 18 inherit more specific Classification Jani 43.$x$ from the semantic units 40.$x$ and/or pointers 47.$x$ in the knowledge database 11 that are in a more specific neighborhood or context. From there on these Classification Jani 43.$x$ take over and classify and restructure the input network 18 and possibly trigger Segmentation Jani 46.$x$ that create new units (e.g., unit 53 in FIG. 4D) in the input network 18 by grouping/segmenting existing ones, as described further above in connection with the segmentation process.

Instead of using a Root Object and Root Jani, one can use any other approach which allows to establish at least one initial connection between one object 50.$x$ or 51.$x$ of the input network 18 and one of the semantic units 40.$x$ or pointers 47.$x$ of the knowledge database 11. Such a connection can for example be randomly established. If an initial connection is established to one particular semantic unit 40.$x$ or pointer 47.$x$ of the knowledge database 1 the Classification Janus 43.$x$ attached to this semantic unit 40.$x$ or pointer 47.$x$ is cloned (copied) to the respective object or pointer. Then, the classification process is started, as described above.

The present invention can also be used for data mining purposes. The inventive approach allows to extract meaning from the textual information conveyed in an input network 18 and can process huge amounts of information. It can determine relationships and trends that were previously invisible or unclear. The inventive approach allows to automatically apprehend meaning of an input network 18 with a previously unmatched quality.

It has been described, how the concept of a self-organizing fractal semantic network can be applied to the problems of Natural Language Understanding. In the present context, input strings 12 (e.g., texts) are transformed into initial input networks 18. Structuring and connecting these input networks 18 to knowledge databases 11 with the help of the Classification and Segmentation methods described above then accomplishes the task of understanding these input strings 12.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

If not otherwise stated herein, it is to be assumed that all patents, patent applications, patent publications and other publications (including web-based publications) mentioned and cited herein are hereby fully incorporated by reference herein as if set forth in their entirety herein.

What is claimed is:

1. A computer implemented method for enriching an input network with knowledge from a fractal semantic knowledge network, wherein said input network comprises objects and pointers between said objects, and the knowledge network comprises semantic units and a plurality of modules arranged in a fractal semantic network, whereby any one of said modules is associated with one or more of said semantic units such that the respective module is able to operate on the one or more of said semantic units, said method comprising the steps of:
   a. finding a counterpart element for an object or a pointer by looking for a semantic unit that is related to the object or the pointer;
   b. establishing a classification connection between the object or the pointer and its counterpart element;
   c. assigning the module that is associated with the counterpart element, if any, to the object or the pointer;
   d. determining the neighborhood of the object or the pointer in the input network and the neighborhood of the counterpart element in the knowledge network, and comparing the neighborhoods to verify the classification connection.

2. The method of claim 1, further comprising the step of:
   e. logically segmenting the input network by having another module explore the neighborhoods of semantic units to find an upward neighbor semantic unit or segment on a higher scale in the knowledge network, and by adding a corresponding segment unit to the input network.

3. The method of claim 2, whereby a classification connection is established between the segment unit and the semantic unit or segment which is on a higher scale in the knowledge network.

4. The method of claim 2, whereby steps a) through e) are repeated iteratively until classification connections are found for some or all of die objects and/or pointers of the input network and some or all of the objects and/or pointers of the input network are segmented on higher levels of hierarchy.

5. The method of claim 1 whereby the modules can be individually triggered to initiate any of the steps b), C), d), or e).

6. The method of claim 5, whereby scheduling mechanisms are employed to individually trigger the modules.

7. The method of claim 6, whereby there is one scheduling mechanism which ensures that those modules which are assigned to objects representing a verb are triggered first.

8. The method of claim 6, whereby the scheduling mechanisms are employed to ensure that the modules are triggered in a predefined order.

9. The method of claim 1 whereby during step d) or e) the module verifies whether the neighborhood of the object or pointer to which it is assigned resembles the neighborhood of the semantic unit to which it is associated.

10. The method of claim 1, whereby steps a) through d) are repeated iteratively until a classification connection is found for some or all of the objects and/or pointers.

11. The method of claim 1 wherein the modules are capable of operating independently and concurrently.

12. The method of claim 1 wherein some of the semantic units comprise connections that are hierarchical connections being employed to group some of the semantic units together cidier by similarity with other semantic units or by functionality with other semantic units.

13. The method of claim 1, whereby more than one module can be associated with a semantic unit, or can be assigned to an object or pointer.

14. The method of claim 1 wherein the knowledge network comprises a root semantic unit.

15. The method of claim 14, wherein the root semantic unit is considered to be a counterpart element for an object for which no counterpart element is found in step a).

16. The method of claim 1 whereby a search algorithm is employed in step a) for finding a counterpart element.

17. The method of claim 16, wherein the search algorithm is a string-matching algorithm, a partial string-matching algorithm, a fuzzy string-matching algorithm, an algorithm that analyzes word characteristics, or an algorithm that analyzes frequency spectra.

18. The method of claim 1 whereby step a) is only carried out for certain groups of objects, preferably verbs and/or nouns.

19. The method of claim 1, wherein the module a software object.

20. The method of claim 19, whereby in step c) the module is assigned to the object or pointer by copying or cloning the software object.

21. The method of claim 1 whereby the module after having been assigned to an object or pointer still remembers to which semantic unit it was associated.

22. The method of claim 1, whereby connections are established between objects and/or pointers or the input network and semantic units of the knowledge network.

23. The method of claim 1, whereby a classification probability (Cx) is assigned to the classification connection such that a high classification probability (Cx) indicates a good match between an object or a pointer and a counterpart element.

24. The method of claim 23, whereby the classification probability (Cx) is increased if the module finds out that the neighborhood of the object or the pointer to which the module is assigned resembles the neighborhood of the semantic unit to which the module is associated.

25. A computer implemented software module being assignable to an object or a pointer of an input network, whereby said software module when being triggered, performs the steps of:
   comparing the neighborhood of the object or pointer to which it is assigned with a neighborhood of a counterpart element of a fractal semantic knowledge network in order to verify a classification connection between said object or pointer to which it is assigned and the counterpart element;

updating a classification value (Cx) of the classification connection if the neighborhood of said object or pointer in the input network resembles the neighborhood of the counterpart element in the knowledge network.

26. The software module of claim 25, whereby, in comparing the neighborhoods, the software module verifies whether the object or the pointer in the input network and the counterpart element in the knowledge network are alike; or the object or the pointer in the input network and the counterpart element in the knowledge network are able to perform similar tasks; or the objector the pointer in the input network and the counterpart element in the knowledge network have similar goals; or the object or the pointer in the input network and the counterpart element in the knowledge network is more general or more specific; or the object or the pointer in the input network and the counterpart element in the knowledge network are constituents or groups; or the object or the pointer in the input network and the counterpart element in the knowledge network are in similar states.

27. The software module of claim 25, wherein the classification value (Cx) re resents the degree of similarity of the neighborhood of the object or pointer and the neighborhood of the counterpart element in the knowledge network.

28. The software module of claim 25 serving as a Classification Janus.

29. A natural language processing system comprising a plurality of software modules pursuant to claim 25.

30. A computer implemented software module being assignable to an object or a pointer of an input network, whereby said software module when being triggered, performs the steps of:

looking for semantic units in a fractal semantic knowledge database which belong to a counterpart segment on a higher level of hierarchy; and if such a counterpart segment is identified, creating a new segment unit in the input network, and creating a classification connection from the new segment unit to the counterpart segment.

31. The software module of claim 30, wherein the software module is designed to allow the segmentation of input semantic units; or de-segmentation of input semantic units; or fusion of two or more input semantic units into one input semantic unit; or fission of an input semantic unit; or foundation of segments; or optimization of a boundary between segments.

32. The software module of claim 30 serving as a Segmentation Janus.

33. A natural language processing system comprising a plurality of software modules pursuant to claim 30.

34. A natural language processing system implemented in a computer for enriching an input network with knowledge from a fractal semantic knowledge network, whereby the input network comprises objects and pointers between said objects, and the knowledge network comprises semantic units, the system comprising:

a module for finding a counterpart element for an object or a pointer by looking for a semantic unit that is related to the object or the pointer;

a module for establishing a classification connection between the object or the pointer and its counterpart element;

a module for examining the objects' or the pointers' neighborhoods in the input network by comparing them with the counterpart elements' neighborhoods in knowledge network to verify the classification connection.

35. The natural language processing system of claim 34, further comprising a module which logically segments the input network by exploring the neighborhood of semantic units and/or pointers to find an upward neighbor semantic unit or segment on a higher scale in the knowledge network, and adding corresponding segment units to the input network.

36. The natural language processing system of claim 34 whereby some or all of the modules are software objects.

* * * * *

UNITED STATES PATENT AND TRADEMARK OFFICE
CERTIFICATE OF CORRECTION

PATENT NO.         : 6,950,814 B2
APPLICATION NO. : 09/888699
DATED              : September 27, 2005
INVENTOR(S)      : Meltin Bell It is certified that error appears in the above-identified patent and that said Letters Patent is hereby corrected as shown below:

Column 19, Line 61, "die" should be --the--

Column 20, Line 21, "cidier" should be --either--

Column 21, Line 32, "re resents" should be --represents--

Signed and Sealed this

Third Day of April, 2007

JON W. DUDAS
*Director of the United States Patent and Trademark Office*